Sept. 8, 1964 J. E. THORNTON 3,148,357

CURRENT SWITCHING APPARATUS

Filed Sept. 28, 1959 2 Sheets-Sheet 1

INVENTOR

JAMES E. THORNTON

BY Cushman, Darby & Cushman

ATTORNEYS

Sept. 8, 1964 J. E. THORNTON 3,148,357

CURRENT SWITCHING APPARATUS

Filed Sept. 28, 1959 2 Sheets-Sheet 2

INVENTOR
JAMES E. THORNTON

BY Cushman, Darby & Cushman
ATTORNEYS

United States Patent Office 3,148,357
Patented Sept. 8, 1964

3,148,357

CURRENT SWITCHING APPARATUS

James E. Thornton, St. Paul, Minn., assignor to Sperry Rand Corporation, New York, N.Y., a corporation of Delaware Filed Sept. 28, 1959, Ser. No. 842,805
23 Claims. (Cl. 340—174)

This invention relates generally to switching circuitry and more specifically to transistor switching apparatus for directing a current impulse of constant amplitude through a utilization device without altering the amplitude of that current.

In the electrical communications industry and also in the field of electronic data processing, semi-conductors are finding wide application because of their inherent advantages over prior art vacuum tube arrangements. These advantages include low standby power consumption, increased reliability, smaller size, and lower signal level operation. In adapting transistor type semi-conductive devices to digital computing apparatus, certain difficulties have arisen due to variations in the current impulse amplitudes. Where this problem becomes most acute is in the memory portion of data processing devices where it is imperative to control both the amplitude and width of the various control and drive pulses properly. Operation of magnetic core memories, for example, requires selective current switching between a large plurality of utilization devices. Variations of current amplitude caused by unwanted switching transients and current spikes may be a chief source of error in the coincident current type memory system.

The apparatus of the present invention obviates the above difficulties by providing at least two transistors operating between positive saturation and negative cutoff, i.e., as a switch, each one of these transistors having loads of substantially similar impedance characteristics in their respective collector circuits. A constant current source operating in conjunction with a suitable current inertia device provides the energy which may be switched to one or the other of the loads by means of the transistor type switches. These transistors are controlled such that only one is conducting at any given time. Since, as indicated above, the loads are substantially identical in their impedance characteristics, the current amplitude remains constant no matter which one of the load devices is activated. The current inertia device tends to eliminate or smooth out any sudden changes in current amplitude resulting from the switching process itself.

In applying the present invention to magnetic core coincident current memory systems, one of the loads may be used as a "dummy", i.e., as an equalizing network having the same impedance characteristics in both magnitude and phase as the actual core memory to be operated. The other load, which may be termed the active load, may be a predetermined one of a plurality of magnetic core matrix drive lines, which may be selected in any conventional manner.

It is accordingly an object of the present invention to provide improved current switching apparatus which causes a substantially constant current impulse to be delivered to a load with a minimum of transient effects.

Another object of this invention is to provide current switching apparatus which continuously delivers a current of substantially constant magnitude to at least two loads, one at a time.

A further object of this invention is to provide current switching apparatus which continuously delivers a current of substantially constant magnitude which may be used to transfer energy alternately between at least two loads resulting in a substantially constant magnitude current impulse in at least one of the loads.

A still further object of this invention is to provide a completely transistorized current switching apparatus for use in a coincident current memory system that will deliver a current of predetermined constant magnitude to a selected portion of the storage elements at selected times.

Other objects and advantages of this invention will become obvious to those having ordinary skill in the art by reference to the following detailed description of exemplary embodiments of the apparatus and the appended claims. The various features of the exemplary embodiments may best be understood with reference to the following drawings, wherein:

Figure 1:
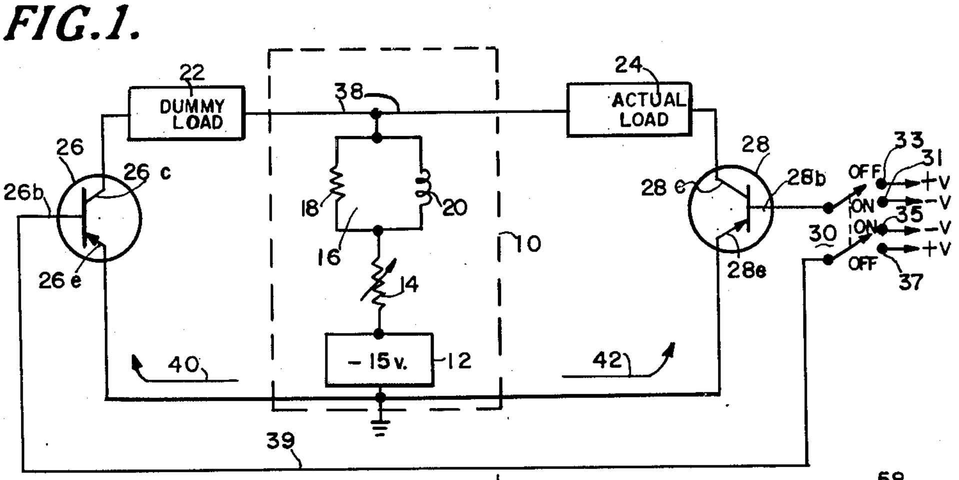
FIGURE 1 illustrates a simplified embodiment of this invention.

In FIGURE 1, a constant current source shown enclosed by chain line 10, is comprised of a negative potential sink 12, which may be a regulated voltage supply of −15 volts for example, and a variable resistance element 14 serially connected between sink 12 and a current inertia device 16. The inertia device may be an inductance alone, but preferably includes the illustrated parallel combination of resistor 18 and inductor 20. Current inertia as mentioned herein is intended to refer to the effect of the inductive element 20 in resisting any sudden change in the current amplitude as is well known in the art. Because of the inclusion of this device, any transient impulses resulting from the switching of the transistor elements yet to be described are ineffective to alter the amplitude of the impulse waveform.

Current from source 10 flowing through the receiving and continuously delivering current inertia device 16, may be switched so as to flow through either load 22 or load 24 depending on the polarity of the control potentials applied to the base electrodes **26*b* and 28*b* of the grounded emitter transistor stages 26 and 28 respectively. As shown in FIGURE 1, transistors 26 and 28 are of the PNP type. It should be understood however, that NPN transistors could just as well be employed in this invention if the proper polarity conventions are observed. The base connections of transistors 26 and 28 are brought out to the terminals of a double pole double throw type switch 30 or its logical equivalent such as a flip-flop. With the control potentials applied to the contact terminals 33 and 35 of switch 30 as illustrated, transistor 26 is in its low impedance or conductive state ("on") due to its base 26*b* being more negative than its emitter 26*e*, while transistor 28 is in its high impedance or non-conducting state ("off") because its base 28*b* is more positive than its emitter 28*e***.

Under this condition, current is able to flow in the direction indicated by arrow 40 from the positive side (ground) of sink 12 via emitter **26*e*, collector 26*c*, load 22, current distribution line 38, the inertia device 16, and variable resistance 14 back to the regulated negative potential sink 12. Because transistor 28 is cut off by the positive potential applied via contact 33 to base electrode 28*b* thereof, a high impedance to the flow of current is presented to this branch resulting in a negligible leakage current (in the order of one microampere) flowing through load 24**.

Alternatively, by reversing the position of switch 30, the proper control potential will be applied to base **28*b* of transistor 28** so as to render this transistor highly conductive. With transistor 28 conducting, a current impulse may flow in the direction indicated by arrow 42, i.e., through transistor 28, load 24, current distribution line 38, and back through the inertia device 16 to the negative potential sink 12. At the same time, the reversal of switch 30 applies a positive potential via contact 37 and line 39 to terminal 26*b* of transistor 26. Since emitter 26*e* is at ground potential, a reverse bias is applied to the emitter-base junction thereby rendering transistor 26 non-conducting which in turn cuts off the flow of current through load 22.

It can be seen that if load 22 has the same passive impedance characteristics as load 24, the steady state amplitude of the current normally flowing through load 22 will remain unchanged when made to flow through load 24. The transient current resulting from the fact that the switching of the transistors from one state to another is not instantaneous, may tend to alter the amplitude of the load current during the switching interval were it not for the inductive circuit 16. Circuit 16 tends to smooth out any discontinuities since as previously mentioned inductor 20 prevents any sudden changes in current amplitude. By applying standard circuit analysis to the configuration of FIGURE 1 and by assuming that the transistors have zero impedance when conducting and infinite impedance when non-conducting, it can be shown that the response to a unit impulse occurring at $t=0$, i.e., at the moment of switching, is $$i_L(t)=\left(\frac{1+I_{ss}}{L}\right)\epsilon^{\frac{-R(t)}{L}}$$

where $i_L(t)$ is the time variation of the load current, L is the inductance of inductor 20 in henrys, $I_{SS}$ is the amplitude of the normal steady state load current, and R is the total circuit resistance around a given path. It can be seen from this equation that as the inductance of the circuit is increased, the amplitude of the time varying component of the load current is correspondingly decreased. Also, this time varying component is extended over a longer period of time which in effect tends to smooth out any irregularities in the load current waveform.

For the purpose of illustration of typical component values, transistors 26 and 28 may be surface barrier transistors such as type SB–100 produced by the Philco Corporation. Using this transistor in Class D operation, i.e., as a switch, a potential of +0.25 volt or more is needed at terminals 33 and 37 to hold the transistors non-conducting and a negative potential of —0.25 volt is sufficient at terminals 31 and 35 so as to render the transistors conducting. Resistor 18 in parallel with inductor 20 is chosen so as to be of such a value so as to critically damp out or suppress any oscillations which may be present due to stray capacities resonating with the inductive element 20. The impedance of load 22 which may be termed a "dummy" load is, as mentioned previously, dependent on the impedance characteristics of the actual load 24 in that for proper operation, the two loads must be substantially equal.

Figure 2:
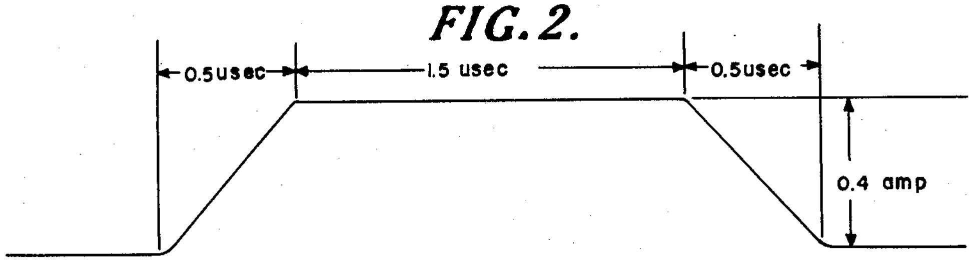
FIGURE 2 illustrates an exemplary current impulse waveform resulting from the switching of the exemplary embodiment of FIGURE 1.

FIGURE 2 illustrates the current waveform obtained from the circuit of FIGURE 1 when switch 30 is moved to the alternate or lower position momentarily, for example for two microseconds, and then returned to the illustrated or upper position. It is to be understood that the rise and fall time of the current impulse is dependent on the impedance characteristic of the load circuit as well as on the characteristics of the switching transistor. Therefore, the values of current and time shown in FIGURE 2 are merely illustrative.

For exemplary and simplicity purposes, only one actual load network, i.e., load 24 and transistor 28, has been shown. It is apparent, however, that it is within the scope of this invention to have a plurality of such networks all in parallel, with each having substantially the same impedance and only one being switched on at a time.

Figure 3:
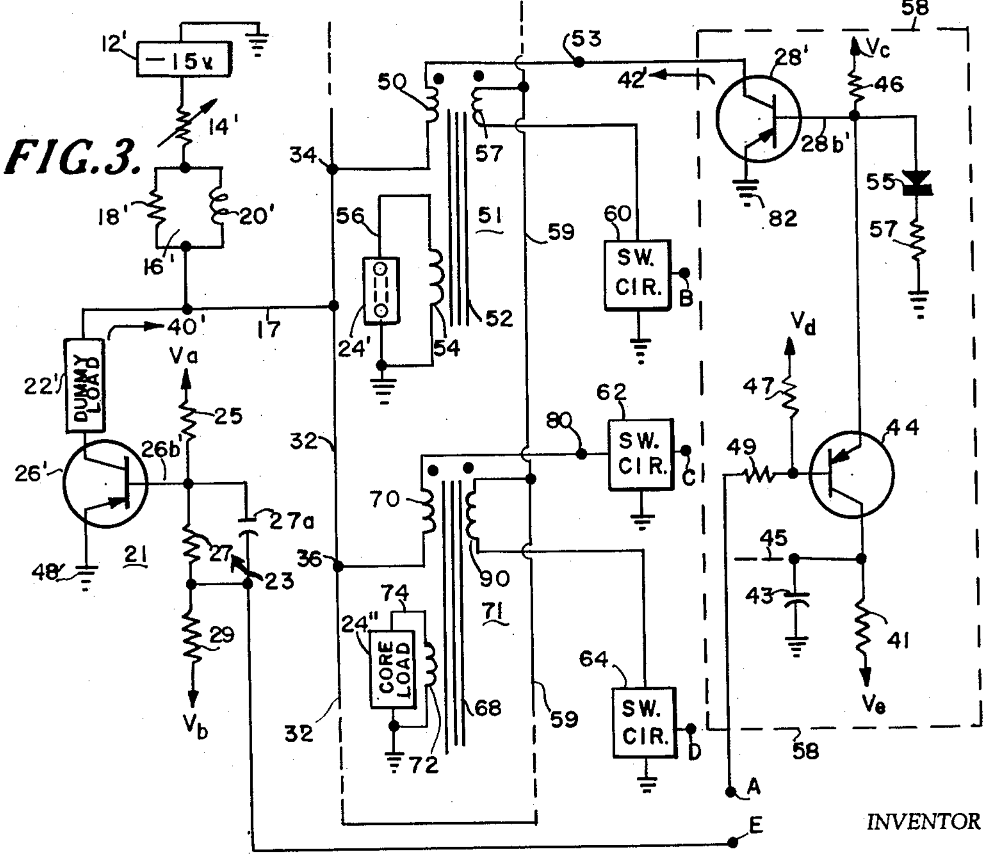
FIGURE 3 illustrates a partial schematic diagram of an embodiment adapted for use with a coincident current magnetic core memory.

FIGURE 3 shows the manner in which the transistorized constant current switching circuit of FIGURE 1 can be applied to a coincident current magnetic memory drive system. Before describing the operation of the circuit, a brief review of the manner in which a coincident current memory operates might be helpful in forming a basis for the terminology to be used in the description of the circuit.

The read sequence, as is well known in the digital computing art, includes a "read" step, a "restore" step and a "disturb" step. The read step is executed by two coincident current "half" pulses on the current distribution lines or so called X and Y memory drive lines. The amplitude of these pulses is such that the combined effect of both pulses forces any core situated at the X–Y intersection to the arbitrarily defined 0 state. Only one pulse to a core will have no altering effect since one "half" pulse is not of sufficient amplitude to change the state of the core. When a core containing a binary 1 is thus switched to 0, the change in flux is detected by a suitably arranged sense winding. However, if the core was already in the 0 state prior to the application of the "read" pulses, a negligible E.M.F. is produced in the sense winding.

The "restore" step is used to rewrite the information back into the cores whose information was destroyed during the "read" step and also consists of the application of coincident current "half" pulses on the X and Y drive lines under the control of an inhibiting pulse applied by means of an additional winding.

The disturb step is used to counteract the effect of the simultaneous application of coincident pulses on the X and Y drive lines and the inhibit line. The net result on a core of the above combination of pulses is that the core assumes a rest position in one of its minor hysteresis loops. When later half selected, this core will induce a larger signal in a sense winding than when it is at rest in its major hysteresis path. The disturb step consists in applying a pulse of proper polarity to return the core to a rest position which is closer to the major axis than that in the above mentioned minor hysteresis path. This helps reduce the induced sense signal when the core is later half selected. Although the disturb step is part of the read sequence and has possible use with the invention, it does not bear directly thereon, and has been included mainly for completeness.

The write sequence is similar to the read sequence and includes three steps termed the "clear," "write," and "disturb" steps. The "clear" step is similar to the "read" step described above. The "write" step, like the "restore" step described above, is also executed by two coincident current "half" pulses on the X and Y memory drive lines. However, these pulses are of the opposite polarity to the pulses used in the "clear" step. If a 0 is to be written, the effect of the two coincident pulses is cancelled by a controlled inhibit pulse, which is of the opposite polarity but approximately equal in amplitude to one of the writing pulses. In such a case, the core does not return to a rest position on its major hysteresis path, but rather to a rest position on a minor hysteresis loop path. A disturb pulse is now applied as above described with the result that the core assumes a rest position closer to its major hysteresis path. If a 1 is to be written, the inhibit pulse is not applied and the resulting two half fields are sufficient to switch the core to the 1 state. The purpose of the "disturb" step does not have a direct relationship to the present invention but again has been included primarily for the sake of completeness.

In describing the circuit of FIGURE 3, wherein a preferred embodiment of this invention is shown, the circuit elements performing the same function as those in FIGURE 1 are given the same number, only in FIGURE 3 the numbers are primed. This figure shows three current networks 21, 51 and 71 containing respectively dummy load 22′, active load 24′ and another active load 24″ all connected in parallel to negative sink 12′ through the current receiving and continuously delivering impedance network 16′ and variable resistor 14′. Current from negative sink 12′ is conducted to network 21 through line 17, and to networks 51 and 71 through line 17 and current distribution line 32. While two lines 17 and 32 are illustrated for conducting this current, it is within the scope of this invention to only use one such line since all the loads including dummy load 22′ are in a parallel circuit connection.

Dummy load 22′ is coupled in the collector circuit of transistor 26′ and otherwise connects to the inertia impedance device 16′. The base of transistor 26′ is connected to terminal E through a pulse shaping circuit 23 including resistor 27 and capacitor 27*a* connected in parallel. This base is biased from a voltage supplied by voltage sources $V_a$ and $V_b$ through resistors 25, 27 and 29 and by a voltage supplied through terminal E from the circuit of FIGURE 4 as will be hereinafter explained. The purpose of pulse shaping circuit 23 is to provide a desired time constant for the voltage supplied through terminal E. With the emitter of transistor 26′ grounded, the emitter-to-base bias is such that under normal conditions, transistor 26′ is in its low impedance conducting state.

Current network 51 includes a transformer 52 having primary winding 50 and secondary winding 54. One end of the primary winding is connected to the main current distribution line 32 at junction 34. The other end of winding 50 is connected at terminal 53 to the collector of transistor 28′. The base of transistor 28′ is normally biased into its high impedance, nonconducting state, by a positive voltage $V_c$ of approximately 15 volts which is applied thereto through resistor 46. Transistor 28′ is controlled by a current amplifying transistor 44 through an emitter-to-base connection. The base of transistor 44 is biased by a positive voltage $V_d$ of approximately 15 volts through resistor 47 and a voltage supplied from the circuit of FIGURE 4 through terminal A and resistor 49.

In its normal condition transistor 44 is nonconducting. The collector of transistor 44 is connected through resistor 41 to a negative voltage $V_e$ of approximately 15 volts. This collector is also connected through capacitor 43 to ground in order to provide a low impedance path for any A.C. currents which may be produced by voltage $V_e$, or by the switching of transistor 44. The dotted lines connected to capacitor 43 show a connection to like elements in switching networks 60, 62 and 64. Diode 55 and resistor 57 are serially connected to the base of transistor 28′ in order to provide isolation between the several switches 60, 62 and 64. The network including transistors 28′ and 44 and the above described circuits as contained within dotted line 58 may be referred to as current switching circuitry or merely a switch. Switches 60, 62 and 64 are preferably identical in structure to switching circuitry 58.

Transformer 52 may also contain a second primary winding 57 wound oppositely to winding 50 (as shown by the dot convention) one end of which is connected to a second main current distribution line 59 which is merely an extension of the main current distribution line 32 so that windings 50 and 57 may be said to be in parallel relative to their connections to line 17 and source 12′. The other end of winding 57 is connected to current switching circuitry 60 which is, as above indicated, preferably identical in structure to current switching network 58. Load 24′ is coupled across secondary winding 54 by line 56. Although load 24′ may be any desired type of load, it is a single group (row or column) of cores when the invention is employed to provide drive currents in a magnetic core matrix, and in that case, line 56 is what is conventionally termed a "drive line."

The circuitry of current network 71 is preferably identical to that of current network 51. Primary winding 70 of transformer 68 is connected at one end to the main current distribution line 32 at junction 36 and to current switching circuitry 62 at terminal 80 at the other end. Terminal C of switching circuitry 62 is used to receive a voltage from the circuit of FIGURE 4 and to apply this voltage to the control transistor (not shown, but like transistor 44 in switching circuit 58) in switching circuit 62. Transformer 68 may also have a second primary winding 90 wound oppositely to winding 70 (as shown by the dot convention) connected at one end to the current distribution line 59 and at the other line to current switching circuitry 64. Terminal D of switching circuit 64 serves the same function as terminal C of switching circuit 62. Load 24″ is coupled to the secondary winding 72 through drive line 74. While only two active networks 51 and 71 are shown in FIGURE 3, it is understood that more (or less) may be used. Therefore it is not intended to limit this invention to two active load networks.

Figure 4:
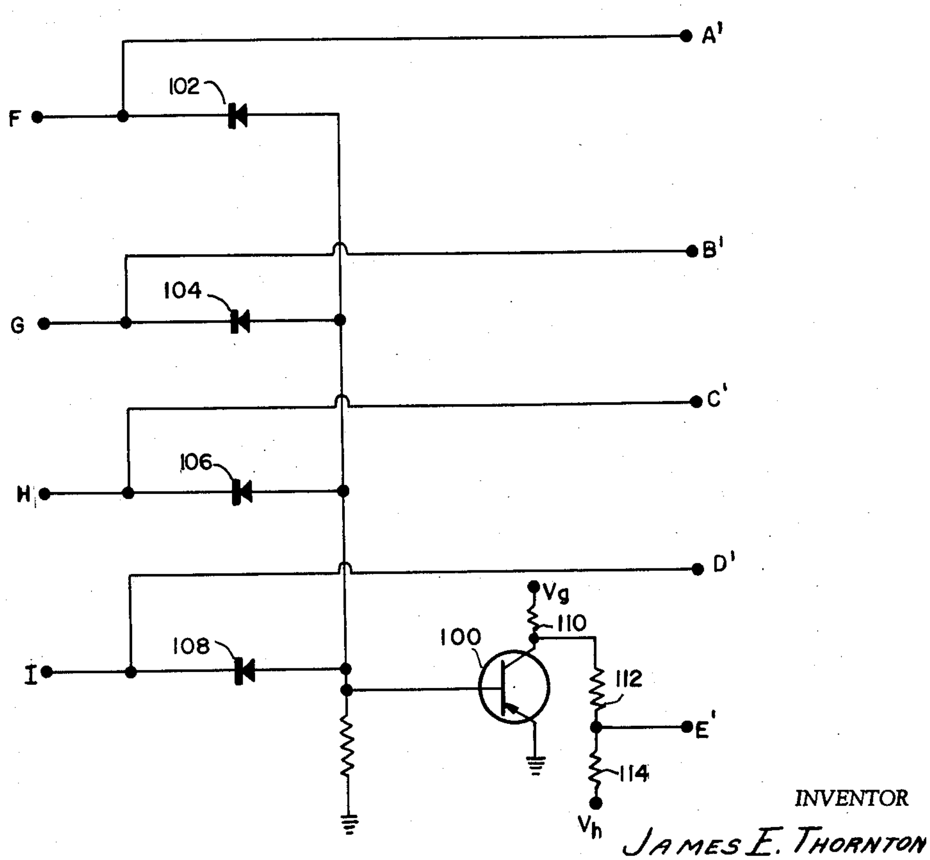
FIGURE 4 illustrates an exemplary pulse applying circuit which may be used in conjunction with the circuit of FIGURE 3.

Terminals A, B, C, D, of current switching circuits 58, 60, 62 and 64 in FIGURE 3, are respectively connected to terminals A′, B′, C′, D′, of the circuit shown in FIGURE 4, and to the base of their respective control transistors. Terminal E′ is connected to the base of transistor 26′ through terminal E in FIGURE 3. Referring to FIGURE 4, input terminals F, G, H and I are connected respectively to terminals A′, B′, C′ and D′, and to the base of transistor 100 through diodes 102, 104, 106 and 108 respectively. The collector of transistor 100 receives its bias from a voltage divider network which includes a negative voltage source $V_g$, a positive voltage source $V_h$, and resistors 110, 112 and 114. Resistors 110 and 112 are preferably, but not necessarily, made equal in impedance to each other with their total impedance being equal to the impedance of resistor 114. Terminal E′ is connected between resistor 112 and resistor 114.

The purpose of the FIGURE 4 circuitry is two fold. The first is to provide means for applying a positive voltage to the base of each control transistor in switching circuits 58, 60, 62 and 64 thereby insuring that these transistors will not conduct while this voltage is applied. Actually it is not necessary to apply the positive signal if the respective base D.C. bias supplies, for example $V_d$ in switching circuit 58, are made sufficiently large. However, to avoid any possibility of extraneous voltage causing the control transistors to conduct, the respective bases are raised to a higher positive level by the above mentioned voltage. This positive signal is applied by maintaining input terminals F, G, H, I, at the desired positive level. Since terminals F, G, H and I are connected directly to terminals A′, B′, C′, D′, which in turn are connected respectively to the base of each control transistor located in switching circuits 58, 60, 62 and 64, the positive voltage level of F, G, H and I results in a positive voltage on each of the respective control transistor bases.

The second purpose of the FIGURE 4 circuitry is to apply a negative pulse to one of the FIGURE 3 terminals A, B, C, D, while at the same time causing a positive pulse to be applied to terminal E. This negative pulse will force its associated control transistor into conduction while the positive pulse will force transistor 26′ which is associated with the dummy network into non-conduction.

Under normal operating conditions, terminals F, G, H, I are maintained at a positive voltage level. Transistor 100 is therefore normally non-conducting and terminals A′, B′, C′, D′ are normally at a positive voltage level insuring that the control transistor associated with each such terminal is non-conducting. With terminal E′ at zero potential, transistor 26′ in FIGURE 3 is conducting due to the bias supplied from $V_a$ and $V_b$. As a result, a current path indicated by arrow 40′ is established, which allows current to flow from the emitter ground point 48 through transistor 26′, dummy load 22′, and impedance circuit 16′ to the negative source 12′. Since transistor 28′ is in its high impedance state, no current flows therethrough to the primary winding 50 of drive line transformer 52 and, hence, no current is induced into the drive line load 24′ connected to the secondary winding 54 of transformer 52.

As above mentioned, load 24′ may be any desired load, but in a preferred embodiment it is a group of cores arranged in a row or a column. However, no matter what the load configuration may be, it is important that the dummy load 22′ have substantially similar impedance characteristics as load 24′ (and load 24″) for proper operation. Load 22′ may then be an identical core arrangement or a simulated arrangement for substantially the same passive characteristics as load 24′ (and load 24″) in both the resistive and reactive components thereof. For the best results, not only should the loads 22′, 24′ and 24″ be substantially similar impedance-wise, but the impedance characteristics of each entire network 21, 51, 71, should be substantially similar to each other.

In order to select a particular load, for example, a particular group of cores, a positive voltage is momentarily applied to the base terminal 26*b*′ of the transistor 26′ associated with the dummy load 22′ thereby cutting off transistor 26′ and no longer allowing current to flow from negative source 12′ through load 22′. At the same time, the transistor associated with the load to be altered, load 24′ for example, is rendered conductive by applying a negative potential to the base terminal thereof. As previously mentioned, one purpose of the circuit of FIGURE 4 is to apply at the same time, a positive pulse to the base terminal 26*b*′ and a negative pulse to the base terminal 28*b*′. This is accomplished by applying a negative pulse to the desired FIGURE 4 input terminal F, G, H, or I, e.g., terminal F. This places a negative potential on the associated output terminal A′, B′, C′, or D′, e.g., terminal A′, and at the same time causes transistor 100 to conduct thereby raising its collector voltage. Terminal E′, which is coupled via terminal E in FIGURE 3 to base terminal 26*b*′, correspondingly raises in potential, causing transistor 26′ to be cut off. The base of transistor 44 is biased negatively due to the negative pulse on terminal A, causing transistor 44 to conduct. This in turn causes base 28*b*′ to lower in potential forcing transistor 28′ into conduction. With the associated transistor (28′ in this example) conducting, the current which was flowing through load 22′ is diverted so as to flow from the emitter ground point 82 through transistor 28′, the first primary winding 50 of transformer 52 to junction 34, thence through the main current distribution line 32 and line 17 to impedance device 16′. The change in current through primary winding 50 causes a current to be induced into the secondary winding 54 to which the load 24′ is connected. Since the load 24′ has the same passive impedance characteristics as load 22′, the steady state amplitude of current normally flowing through load 22′ will remain unchanged when diverted to winding 50. The transient current resulting from the non-instantaneous switching of the transistors is smoothed by inductive circuit 16′. Thus a constant amplitude current with a minimum of transient effects is delivered to the load 24′. If it is desired to select another load, for example load 24″, input terminal C of switch circuit 62 would be pulsed negative causing current to flow through its current switching circuit 62 through primary winding 70 and main current distribution line 32 to the inductive device 16′ via line 17.

In order to perform the write sequence, a second current switching circuit similar to that of FIGURE 1, may be used in conjunction with a second current distribution line 59. However, by employing a second primary winding on the drive line transformer it is possible to obtain both reading and writing with only a single constant current generator. As shown in FIGURE 3, second primary windings 57 and 90 are provided on transformers 52 and 68, respectively. Because of the manner in which these windings are poled, current flowing through a second primary winding will induce current in the associated load in a direction opposite to the induced current resulting when current flows through the associated first primary winding. To write information into a given core or group of cores, the transistor associated with the dummy load is again rendered non-conductive in the manner previously described. Simultaneously, a negative potential is momentarily applied to the base of the switching transistor associated with the load whose information should be altered. This negative potential renders this transistor conductive and establishes a current path from ground, through the selected second primary winding, to the negative potential sink. For example, if it is desired to write information into load 24″, a negative potential is applied to the control terminal I of the circuit in FIGURE 4 as previously explained. This, in turn, applies a negative potential to the transistors associated with current switch 64 and a positive potential to the base of transistor 26′. A positive potential is maintained at the other current switches by their respective D.C. base biases. Under this condition, the only current path from ground to the negative source 12′ is via the second primary winding 90, current distribution lines 59, 32, 17 to impedance device 16′. The change in current through winding 90 causes an induced current to flow through the selected load 24″ connected across the secondary winding 72 of transformer 68. As mentioned before, the direction of this load current flow is opposite to that induced when current is made to flow through winding 70 during the read sequence.

It will be appreciated that the circuit of FIG. 3 provides only one-half the drive current needed to alter the remanent state of a given core. To provide coincident "half currents," an additional switching network similar to that of FIGURE 3 may be employed.

Thus, it is apparent that there is provided by this invention a system in which the various objects and advantages herein set forth are successfully effected.

Modifications of this invention not described herein will become apparent to those of ordinary skill in the art upon reading this disclosure. Therefore, it is intended that the material contained in the foregoing description and the accompanying drawings be interpreted as illustrative and not limitative, the scope of the invention being defined in the appended claims.

What is claimed is:

1. A switching circuit comprising: two current branches; means including an inductance for continuously delivering a predetermined constant amplitude current to the two current branches one of said branches including an actual load and the other of said branches including a dummy load; said dummy load branch having a substantially similar impedance characteristic as said actual load branch; switching means coupled to said branches for allowing the said continuously delivered constant amplitude current to flow at all times through only one of said branches so that said current is neither interrupted nor changed in amplitude but is diverted by said switching means from one branch to the other with a minimum of transient effects to cause a constant amplitude current to flow through said actual load branch each time said actual load branch receives current.

2. A circuit as in claim 1 wherein the switching means includes at least two active elements respectively coupled in said current branches, said active elements being mutually exclusively operable so that one active element is conductive while the other is non-conductive, and vice versa.

3. A circuit as in claim 1 wherein the active elements are transistors.

4. A circuit for providing at selected times to at least one given load, a current which is of a predetermined constant amplitude comprising means including an inductance for receiving and continuously delivering a current, a plurality of networks coupled in parallel to said means, each network having an impedance substantially similar to any other of said networks and including a different given load, and switching means coupled to said networks for allowing the continuously delivered current to flow at all times through said networks mutually exclusively so that said current is not interrupted or changed in amplitude but is diverted by the switching means from one of said networks to another with a minimum of transient effects.

5. A circuit as in claim 4 wherein the switching means includes at least one active element in each network, said active elements being biased at the same time in a manner to cause only one at a time to be conductive.

6. A circuit as in claim 5 wherein the active elements are transistors.

7. A circuit as in claim 4 wherein each of at least some of said networks has at least one current branch containing at least a portion of said switching means and connected to said receiving and continuously delivering means for conducting said predetermined constant amplitude current and has another current path containing its respective given load inductively coupled to said one current branch.

8. A circuit as in claim 7 wherein at least one of said networks includes a second current branch containing a different portion of said switching means and connected to said receiving and continuously delivering means, the two current branches being inductively coupled to the associated said current path in opposite directions so that said continuously delivered current when flowing through one of said two branches produces a current flowing through the respective given load in one direction, and when flowing through the other of said two branches produces a current flowing through the respective given load in a direction opposite to said one direction.

9. A circuit as in claim 8 wherein the portion of said switching means contained in each branch includes at least one active element.

10. A circuit as in claim 9 wherein the active elements in both branches are biased at the same time in a manner to cause one to conduct and the other to be non-conductive and vice versa.

11. A circuit as in claim 10 wherein there is a first and second active element in each branch, said first active element controlling the operation of said second active element.

12. At least one circuit for providing at selected times to a group of magnetic cores a current which is of a predetermined constant amplitude, comprising means including an inductance for receiving and continuously delivering a current, a plurality of networks coupled in parallel to said means, each network having an impedance substantially similar to any other of said networks and including a different group of magnetic cores, and switching means coupled to said networks for allowing the continuously delivered current to flow at all times through said networks one at a time so that said current is not interrupted or changed in amplitude but is diverted by the switching means from one of said networks to another with a minimum of transient effects.

13. A circuit as in claim 12 wherein the switching means includes at least one active element in each network, said active elements being biased in a manner so that only one conducts at a time thereby allowing the continuously delivered current to flow at all times through any of said networks one at a time.

14. A circuit as in claim 13 wherein the active elements are transistors.

15. A circuit as in claim 12 wherein some of said networks each include at least one main current distribution line connected to said receiving and continuously delivering means for conducting said constant amplitude current, and a drive line coupling a group of magnetic cores, said drive line being inductively coupled to said main current drive line.

16. A circuit as in claim 15 wherein at least one of said drive lines is inductively coupled to the main current distribution line in each of two opposite senses, and wherein the switching means allows current in the main distribution line to be induced in the drive line in either of two opposite directions at different times.

17. A circuit as in claim 13 wherein said secondary drive lines are inductively coupled by a plurality of transformers to said main current distribution line.

18. A circuit as in claim 15 wherein said switching means includes a first plurality of active elements, at least one for each transformer, connected through a first plurality of windings to said main distribution line, at least one winding for each transformer, said active elements being biased at the same time in a manner such that only one will conduct at a given time thereby allowing current from said main current distribution line to flow through the winding associated with the conducting active element.

19. A circuit as in claim 18 wherein said switching means includes a second plurality of active elements, at least one for each of said transformers, connected through a second plurality of windings to said main distribution line, at least one winding for each transformer, said second plurality of windings being coupled respectively to a different drive line in an opposite sense than its associated winding in said first plurality of windings and said first and second plurality of active elements being biased at the same time in a manner such that only one active element conducts at one time.

20. A circuit as in claim 15 wherein said some networks include two main current distribution lines connected together and to said receiving and continuously delivering means for conducting said constant amplitude current, said two main current distribution lines being inductively coupled in opposite directions to each drive line so that said continuously delivered current when flowing through one of said main distribution lines produces a current flowing through said group of cores in one direction to perform a read function, and when flowing through the other of said main distribution lines produces a current flowing through said group of cores in an opposite direction to said one direction to perform a write function.

21. A circuit as in claim 20 wherein the switching means includes a plurality of active elements, at least one in each of said networks coupled to each main distribution line, said active elements being biased in a manner so that only one conducts at a time thereby allowing either a reading or writing function to take place.

22. A circuit as in claim 20 wherein there is a different first and second active element included in each network and coupled to each main distribution line, said first active element controlling the operation of said second active element.

23. A circuit as in claim 22 wherein the active elements are transistors.

References Cited in the file of this patent

UNITED STATES PATENTS

| | | |
|---|---|---|
| 2,785,236 | Bright et al. | Mar. 12, 1957 |
| 2,819,456 | Stuart-Williams | Jan. 7, 1958 |
| 2,840,801 | Beter | June 24, 1958 |
| 2,915,649 | Cagle | Dec. 1, 1959 |
| 2,915,650 | Williams | Dec. 1, 1959 |
| 2,989,649 | Welch | June 20, 1961 |
| 2,989,686 | Pinckaers et al. | June 20, 1961 |
| 2,996,621 | Barrett | Aug. 15, 1961 |